United States Patent
Hara

(10) Patent No.: US 6,738,230 B2
(45) Date of Patent: May 18, 2004

(54) METHOD AND APPARATUS FOR POSITIONING A MAGNETIC HEAD USING A DUAL-STAGE ACTUATOR IN AN INFORMATION RECORDING AND/OR PLAYBACK DEVICE

(75) Inventor: Takeyori Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 97 days.

(21) Appl. No.: 10/090,853

(22) Filed: Mar. 5, 2002

(65) Prior Publication Data

US 2003/0035247 A1 Feb. 20, 2003

(30) Foreign Application Priority Data

Aug. 17, 2001 (JP) ........................................ 2001-248218

(51) Int. Cl.$^7$ ............................................... G11B 21/24
(52) U.S. Cl. ................................................... 360/294.1
(58) Field of Search ................................. 360/294.1, 75

(56) References Cited

U.S. PATENT DOCUMENTS 6,327,120 B1 * 12/2001 Koganezawa et al. ... 360/294.4

FOREIGN PATENT DOCUMENTS

| JP | 63206978 A | * | 8/1988 | ........... G11B/21/10 |
| JP | 09097481 A | * | 4/1997 | ........... G11B/21/10 |

* cited by examiner

*Primary Examiner*—David Davis
(74) *Attorney, Agent, or Firm*—Greer, Burns & Crain, Ltd.

(57) ABSTRACT

A disk device includes a head part, an actuator part for moving the head part to an objective position, and a control part for controlling the actuator part, wherein the control part makes the actuator part shift to a reverse direction of the movement direction of the head part before a settling action of the head part starts being implemented.

12 Claims, 12 Drawing Sheets

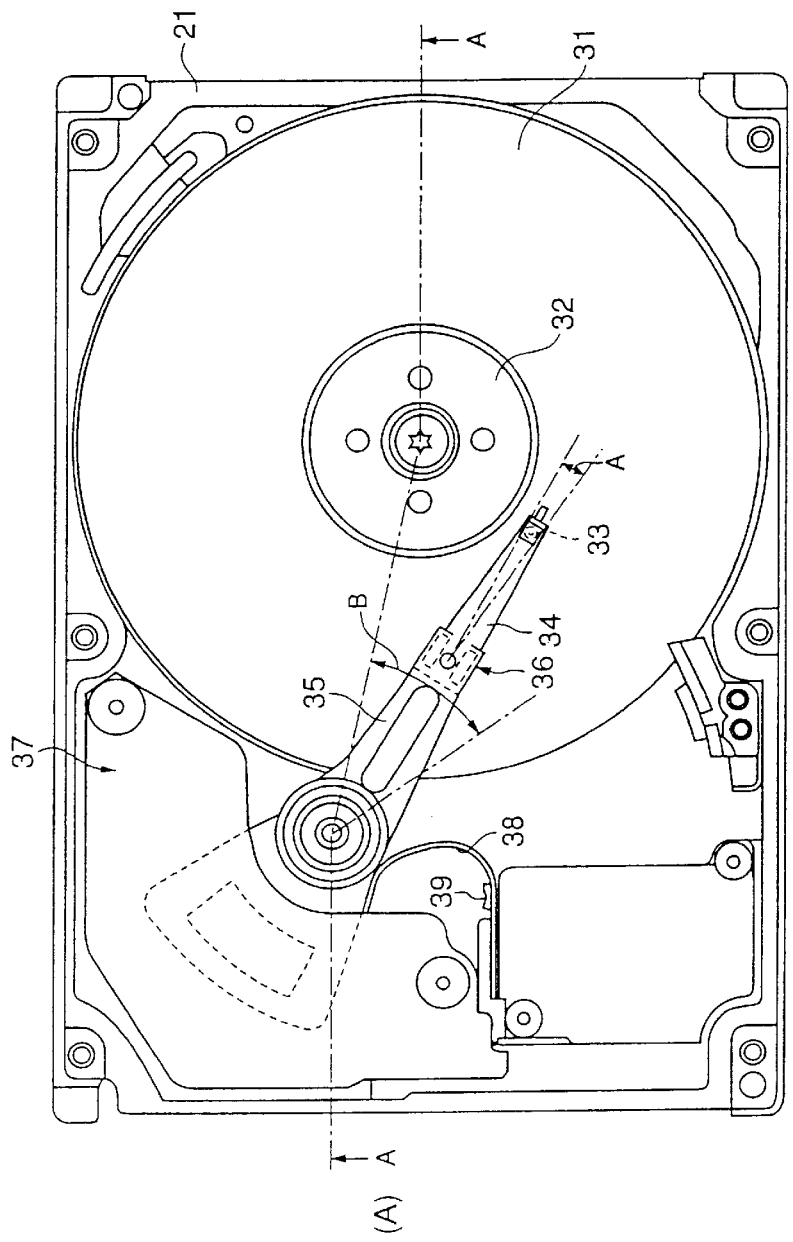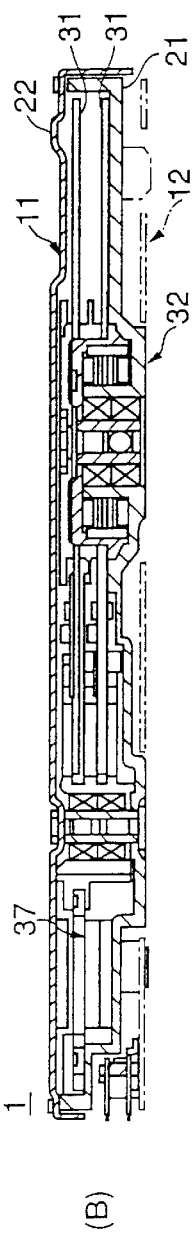
FIG. 1A PRIOR ART
FIG. 1B PRIOR ART

METHOD AND APPARATUS FOR POSITIONING A MAGNETIC HEAD USING A DUAL-STAGE ACTUATOR IN AN INFORMATION RECORDING AND/OR PLAYBACK DEVICE

BACKGROUND OF THE INVENTION

1. Field of the Invention

The present invention generally relates to information recording and/or playback devices and methods of positioning of magnetic heads of the devices, and more particularly, to an information recording and/or playback device and a method of positioning of a magnetic head of the device, in which the magnetic head is positioned by dual-stage actuators.

2. Description of the Related Art

There is great demand to improve the speed and accuracy of positioning a magnetic head of a magnetic disk device. Because of this, a magnetic disk device which has a dual-stage servo system comprising a slight movement actuator and a rough movement actuator is proposed.

For instance, a magnetic disk device having such the dual-stage servo system comprising a slight movement actuator and a rough movement actuator is described in Japanese Laid-Open Patent Application No. 11-031368.

A magnetic disk device having a dual-stage servo actuator will be described.

FIG. 1A is a plan view of the magnetic disk device having the dual-stage actuator. FIG. 1B is a vertical sectional-view taken on line A—A in FIG. 1A. FIG. 2 is a block diagram of the magnetic disk device having the dual-stage actuator.

The magnetic disk device 1 includes a disk enclosure 11 and a circuit board assembly 12.

The disk enclosure 11 has a case 21 and a cover 22. A magnetic disk 31, a spindle motor 32, a magnetic head 33, a suspension 34 and an arm 35, a slight movement actuator 36, and a rough movement actuator 37 are built in a space between the case 21 and the cover 22 of the disk enclosure 11.

The magnetic disk 31 is clamped to the spindle motor 32. The magnetic disk 31 rotates as the spindle motor 32 rotates. The spindle motor 32 is connected to the circuit board assembly 12 and rotates based on a driving signal provided by the circuit board assembly 12.

A magnetic head 33 is fixed on a head end part of the suspension 34. The magnetic head 33 faces the magnetic disk 31. The suspension 34 is provided on a head end part of the arm 35. The suspension 34 is capable of circular movement driven and in a disk radius direction (an arrow A direction). The suspension 34 and arm 35 are connected to each other by the slight movement actuator 36. The slight movement actuator 36, for example, is comprised of a shear type piezo actuator and makes the suspension 34 move circularly and in the arrow A direction. The other end part of the arm 35 is connected with the rough movement actuator 37. The rough movement actuator 37, for example, is comprised of a voice coil motor (VCM) and makes the arm 35 move circularly and in the arrow B direction.

The magnetic head 33 is connected to a flexible print wire board 38 by a print wire in the suspension 34 and the arm 35 or a lead line wired along the arms 34 and 35. A head IC 39 is mounted on the flexible print wire board 38. The head IC 39 is connected to the magnetic head 33. The head IC 39 amplifies a recording signal which is supplied to the magnetic head 33 and a playback signal which is played back by the magnetic head 33. In addition, the flexible print wire board 38 is connected with the slight movement actuator 36 and the rough movement actuator 37.

The head IC 39 is extended to a bottom surface side of the case 21 by the flexible print wire board 38, and connected to the circuit board assembly 12. The flexible print wire board 38 is connected to the spindle motor 32, the slight movement actuator 36, and the rough movement actuator 37. The flexible print wire board 38 is extended from an inside part of the case 21 to an outside part of a bottom surface of the case 21, that is, piercing the bottom surface.

The circuit board assembly 12 is provided at an outside part of the bottom surface of the case 21. Furthermore, the circuit board assembly 12 is connected to the flexible print wire board 38. The circuit board assembly 12 has a structure in which a hard disk controller (HDC) 41, a random access memory (RAM) 42, a read only memory (ROM) 43, a digital signal processor (DSP) 44, a micro processor unit (MPU) 47, a read channel (RDC) 45, and a servo controller (SVC) 46 are mounted on the print wire board 38.

The HDC 41 is connected to a high ranked controller 51, and thereby the HDC 41 controls a communication with the high ranked controller 51. The RAM 42 is used as a buffer memory in which data communicated with the high ranked controller 51 are stored temporarily. The RDC 45 modulates the recording signal recorded in the magnetic disk 31 and demodulates the playback signal played back from the magnetic disk 31, by the magnetic head 33.

The SVC 46 is connected to the spindle motor 32, the slight movement actuator 36, the rough movement actuator 37, and the DSP 44. The SVC 46 drives the spindle motor 32, as a relative speed of the magnetic head 33 and the magnetic disk 31 becomes a designated value based on the playback signal which is played back by the magnetic head 33. In addition, the SVC 46 controls the slight movement actuator 36 and the rough movement actuator 37 based on instructions from the MPU 44. And thereby, the magnetic head 33 follows a track formed in the magnetic disk 31.

The MPU 44 controls the HDC 41, the RDC 45, and the SVC 46 by firm ware stored permanently in the ROM 43, and thereby the MPU 44 controls an action of the whole of the device.

It is required for the slight movement actuator 36 of the above-mentioned dual-stage servo actuator of the magnetic disk device to have a high speed ability. Because of this, a shear type piezo actuator is used as the slight movement actuator 36.

FIG. 3 is a plan view of the dual-stage actuator in which the shear type piezo actuator is used as the slight movement actuator 36 and the VCM is used as the rough movement actuator 37. The piezo actuator has a movable area of "a"(a plus direction of "a" to a minus direction of "a") where "a" is defined as a distance of 0.5 $\mu$m from a center position of the movable area. The rough movement actuator 37 has a movable area of "b" (a plus direction of "b" to a minus direction of "b") where "b" is defined as a distance of 12 mm from a center position of the movable area.

FIG. 4 is a view showing a frequency response of the piezo actuator namely the slight movement actuator 36. FIG. 5 is a view showing a frequency response of the VCM namely the rough movement actuator 37.

The piezo actuator has a main resonance frequency of 9 kHz, as shown in FIG. 4. On the other hand, the VCM has a main resonance frequency of 5 kHz, as shown in FIG. 5. Therefore, the piezo actuator can act with a higher speed than the VCM.

FIG. 6 is a block diagram of a track following control system of the dual-stage actuator.

At the time of track following, a tracking error signal is necessary. The tracking error signal represents a difference between an information of an objective position of the head and an information of a present position of the head. The tracking error signal is supplied to a controller 62 for controlling the slight movement actuator 36 and a controller 63 for controlling the rough movement actuator 37.

The controller 62 controls the slight movement actuator 36 based on the tracking error signal. The controller 63 controls the rough movement actuator 37 based on the tracking error signal.

The magnetic head 33 is moved a total amount by the slight movement actuator 36 and the rough movement actuator 37. A position of the magnetic head 33 is fed back as information providing a present head position. With the above-mentioned operation, the magnetic head 33 is positioned at the objective position.

FIG. 7 is a block diagram of a track seek control system of the dual-stage actuator.

As shown in FIG. 7, in this system, a control by the slight movement actuator 36 and a control by the rough movement actuator 37 are implemented separately at the time of a track seek. When a seek action in which the magnetic head moves a long distance is implemented, the rough movement actuator 37 makes the magnetic head move. Initially the slight movement actuator 36 is not under feed-back control but is fixed in a designated position. The slight movement actuator 36 starts moving in a latter settling action of the seek action. After a distance between the magnetic head and the objective track becomes so short that the distance is within the movable area of the slight movement actuator 36, the settling action is switched so as to use the slight movement actuator 36.

FIG. 8 is a view showing a wave form of a time response regarding the slight movement actuator, the rough movement actuator, and a head position, according to a conventional art. In FIG. 8, a position of the magnetic head 33 is expressed with a solid line, a driving position of the slight movement actuator 36 is expressed with a dashed line, and a driving position of the rough movement actuator 37 is expressed with an dash-dot line.

When a center of a movable area of the slight movement actuator 36 reaches an objective position 0 of the magnetic head 33 at a time of t0, it is possible to make the objective position 0, that is, move the magnetic head 33 to position 0, by using the slight movement actuator 36. Therefore, the action of the magnetic head 33 is changed from the seek action to the settling action. Since the slight movement actuator 36 is held at the center position of the movable area, the magnetic head 33 is positioned at a distance "a" from the objective position 0 in a minus direction.

Once the settling action starts, the slight movement actuator 36 is driven. When the slight movement actuator 36 is shifted by "a" from the objective position 0 to a plus direction as shown by the dashed line in FIG. 8, the magnetic head 33 is shifted to the objective position 0 in a short period of time. At this time, the rough movement actuator 37 is shifted to the objective position 0 as shown by the one point doted line in FIG. 8. The slight movement actuator 36 is shifted as the rough movement actuator 37 is shifted to make the magnetic head 33 stay at the objective position 0.

Accordingly, the magnetic head 33 can be set in an allowable deviation area where the objective position 0 is a center of the area, as shown by the solid line in FIG. 8. After the settling action is implemented, the track following action is implemented. For example, information recording and/or information playback action is implemented.

The seek action of the magnetic disk device 1 in which the dual-stage actuator servo system consisting of the slight movement actuator 36 and the rough movement actuator 37 is applied, for example, as described in "Masahito Kobayashi, Takashi Yamaguchi, Roberto Horowitz, "Track-Seeking Controller Design for Dual-Stage Actuator in Magnetic Disk Drives", Proceedings of the American Control Conference, Chicago, Ill., June 2000".

A seek action over a short distance is mainly described in the above-mentioned reference. According to the reference, a response to an action in a range exceeding the movable area of the slight movement actuator 36 is improved by a switching means. The switching means allows a control loop of the slight movement actuator 36 and the rough movement actuator 37 to avoid mutual interference and switches respective objective paths at the time of a full operation of the slight movement actuator 36 and the rough movement actuator 37.

If the limitation of the movable area of the slight movement actuator 36 in the settling action of the magnetic disk device having a conventional dual-stage actuator is eased, it may be possible to switch the settling action at an earlier time than t0 shown in FIG. 8. As a result of this, the seek action can be implemented in a shorter period of time. Although a response at the time of settling action is improved under the limitation of the movable area of the slight movement actuator 36, the limitation of the movable area itself is not eased, in a method in the above-mentioned reference.

In order to ease the movable area limitation of the slight movement actuator in the settling action of the magnetic disk device having a conventional dual-stage actuator, it is necessary to solve a difficult problem. That is, it is necessary to expand a range of a driving voltage, or reduce a rigidity of the actuator by making sacrifices to a resonance property of the slight movement actuator 36.

SUMMARY OF THE INVENTION

Accordingly, it is a general object of the present invention to provide a novel and useful information recording and/or playback device method in which positioning of a magnetic head of the information recording and/or playback device is implemented in a short period of time, where one or more of the problems described above are eliminated.

Another and more specific object of the present invention is to provide a disk device including a head part, an actuator part for moving the head part to an objective position, and a control part for controlling the actuator part, wherein the control part makes the actuator part shift to a reverse direction of the movement direction of the head part before a settling action of the head part starts being implemented.

According to the above invention, from a starting time of a seek action to the settling action, the head such as a magnetic head is shifted to a reverse direction of a current direction of a movement of the head. Therefore, it is possible to start implementing the settling action at an earlier timing than the conventional art, and thereby the head can be set at the objective position in a short period of time. Hence, the seek action is implemented quickly.

In the above-mentioned device, the actuator part may comprise a slight movement actuator for a slight movement of the head part and a rough movement actuator for a rough movement of the head part. In addition, an objective position of the slight movement actuator may be shifted to a movement direction of the head part and an objective position of the rough movement actuator may be shifted to a reverse direction of the movement direction of the head part before a settling action of the head part starts being implemented.

According to the above invention, the settling action, by which the magnetic head is set at the objective position, is implemented before the magnetic head reaches the actual objective position. And thereby, the seek action is implemented quickly.

Other objects, features, and advantages of the present invention will be more apparent from the following detailed description when read in conjunction with the accompanying drawings.

BRIEF DESCRIPTION OF THE DRAWINGS

FIG. 1A is a plan view of a magnetic disk device having a dual-stage servo actuator.

FIG. 1B is a vertical sectional-view taken on line A—A in FIG. 1A.

DETAILED DESCRIPTION OF THE PREFERRED EMBODIMENTS

A description will now be given, with reference to FIGS. 9–12, of embodiments of the present invention.

Figure 2:
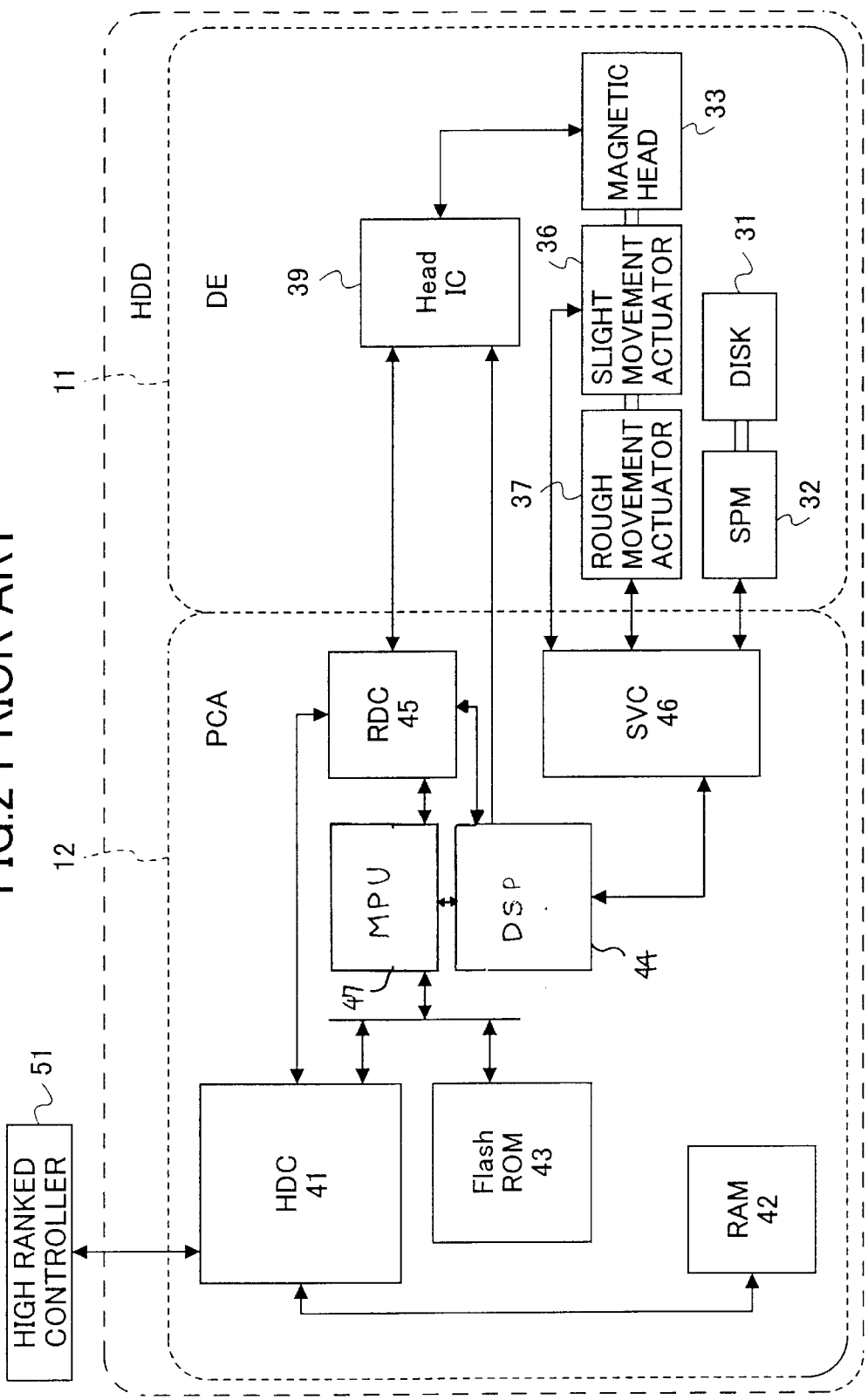
FIG. 2 is a view showing a block structure of a magnetic disk device having a dual-stage servo actuator.
Figure 3:
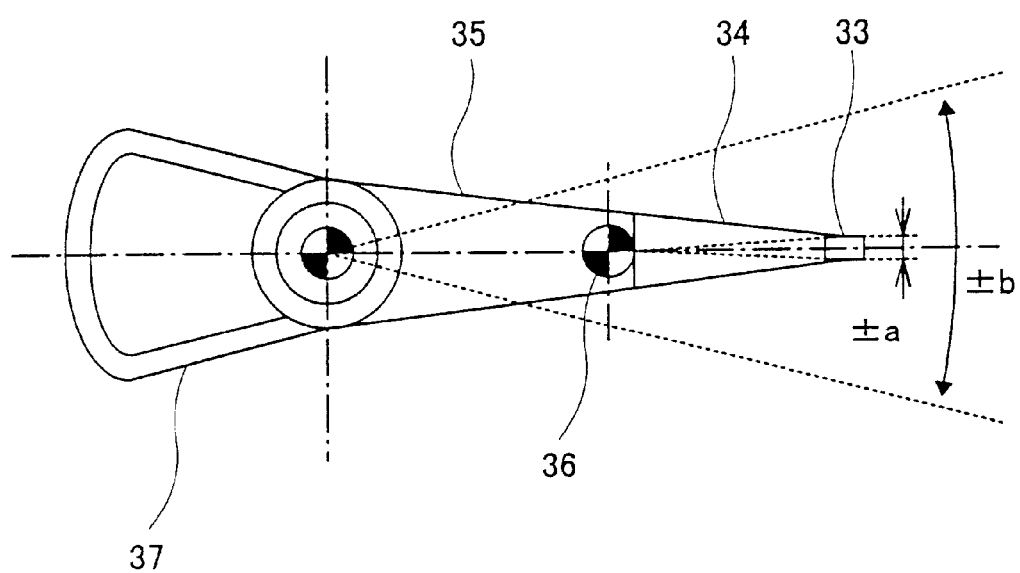
FIG. 3 is a plan view of a dual-stage actuator in which a shear type piezo actuator is used as a slight movement actuator and a voice coil motor as a rough movement actuator.
Figure 4:
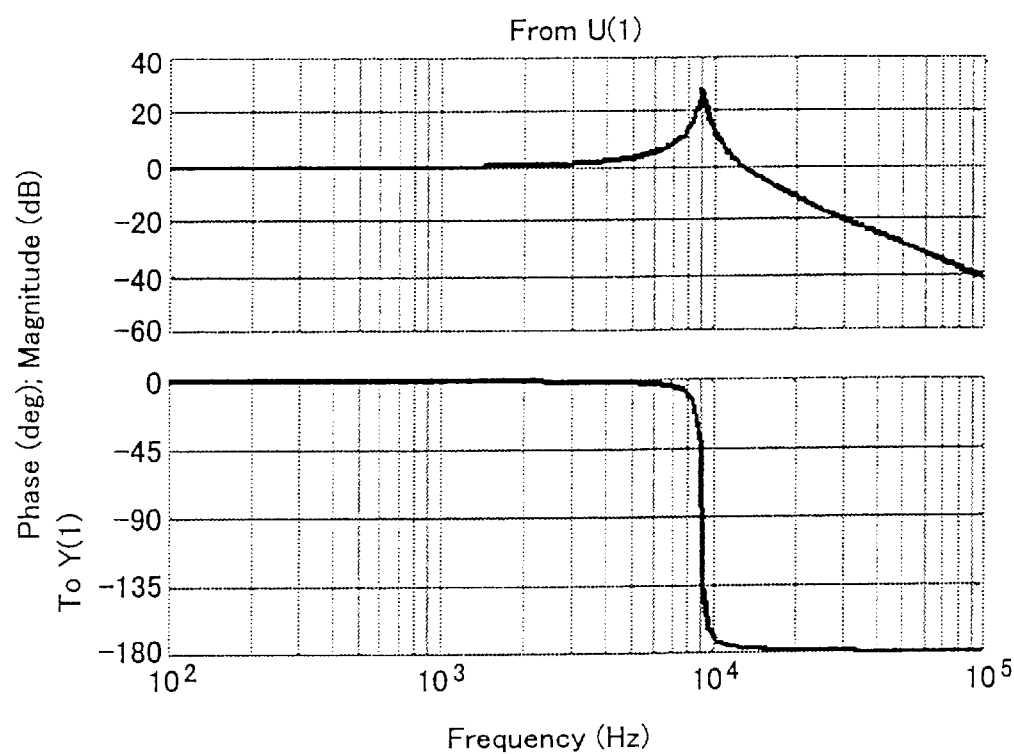
FIG. 4 is a view showing a frequency response of the piezo actuator.
Figure 5:
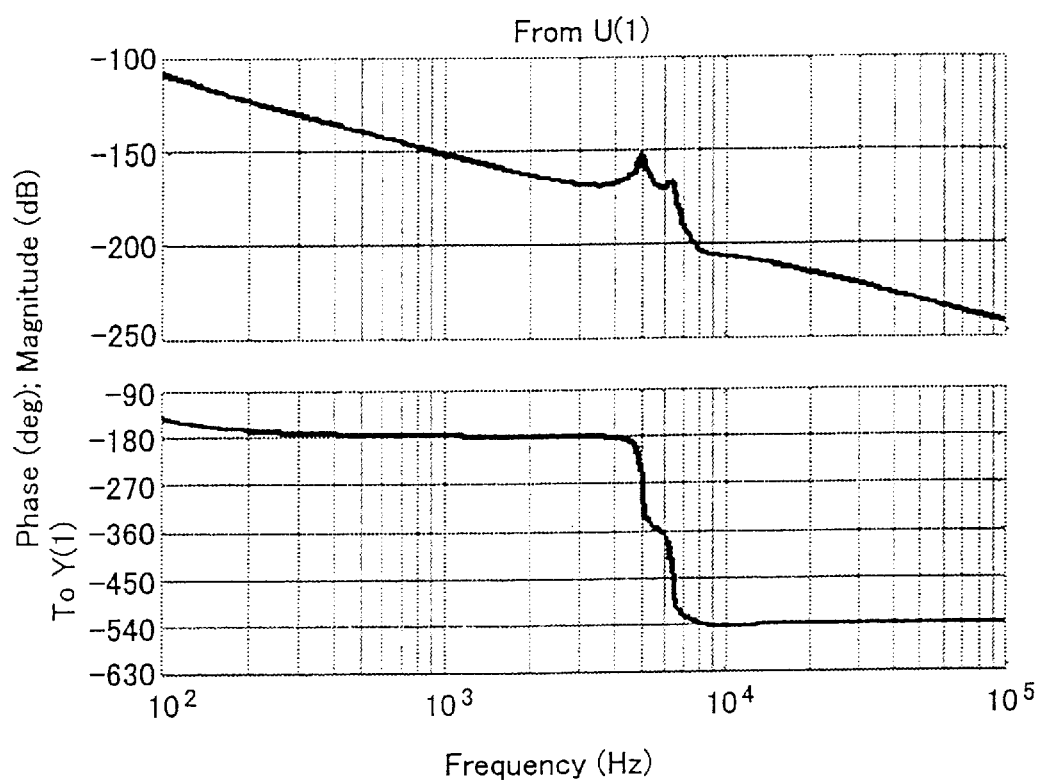
FIG. 5 is a view showing a frequency response of the voice coil actuator.
Figure 6:
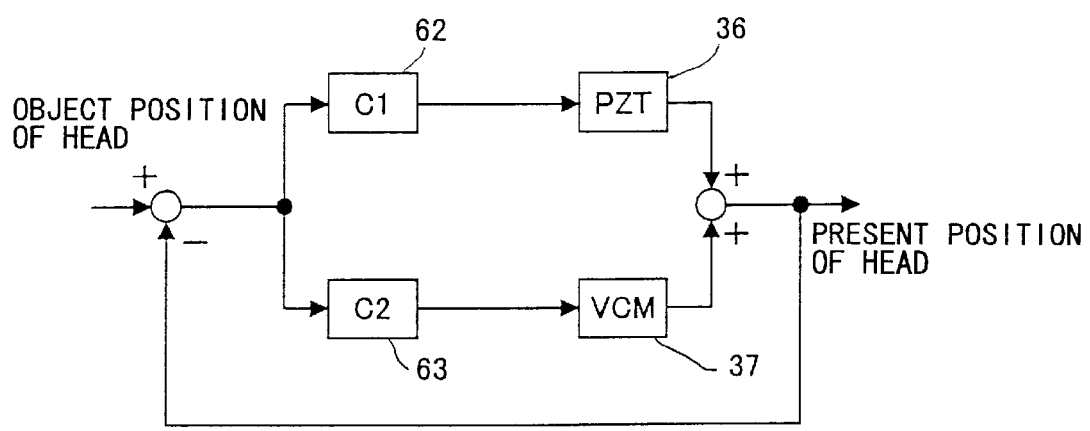
FIG. 6 is a block diagram of a track following control system of the dual-stage actuator.
Figure 7:
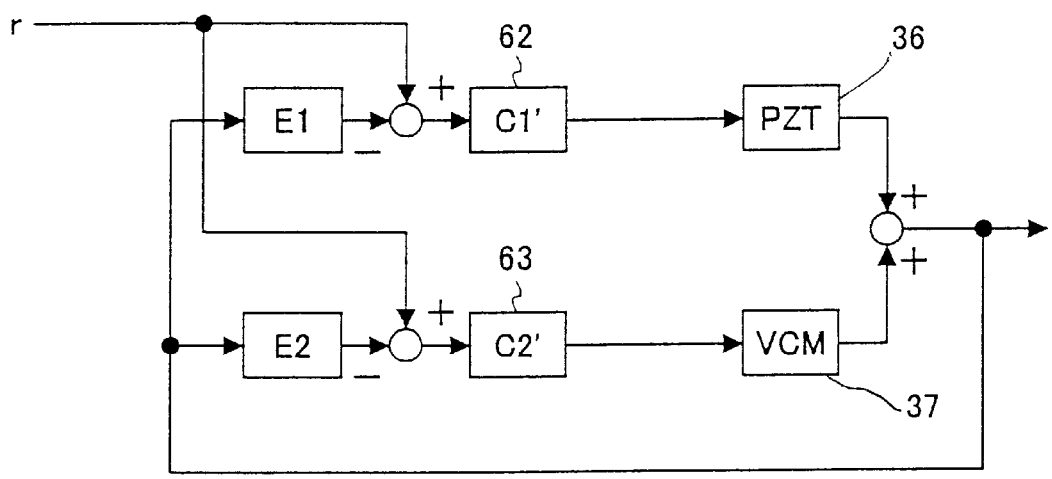
FIG. 7 is a block diagram of a track seek control system of the dual-stage actuator.

The magnetic disk device shown in FIGS. 1 and 2 is used in a first embodiment. In the first embodiment, from a starting time of a seek action to a time of a settling action, the slight movement actuator 36 is offset to a reverse direction of a seek direction in a movable area. In addition, the objective position of the slight movement actuator 36 is offset to the seek direction, and the objective position of the rough movement actuator 37 is offset to the reverse direction of the seek direction in a movable area except for a necessary margin for controlling.

In the magnetic disk device of this embodiment, a firm ware implemented in the DSP 44 is different from one in the conventional disk device shown in FIGS. 1 and 2. Accordingly, a structure of the magnetic disk device in this embodiment is the substantially the same as the structure of the magnetic disk device shown in FIGS. 1 and 2, and explanation thereof will be omitted.

Figure 9:
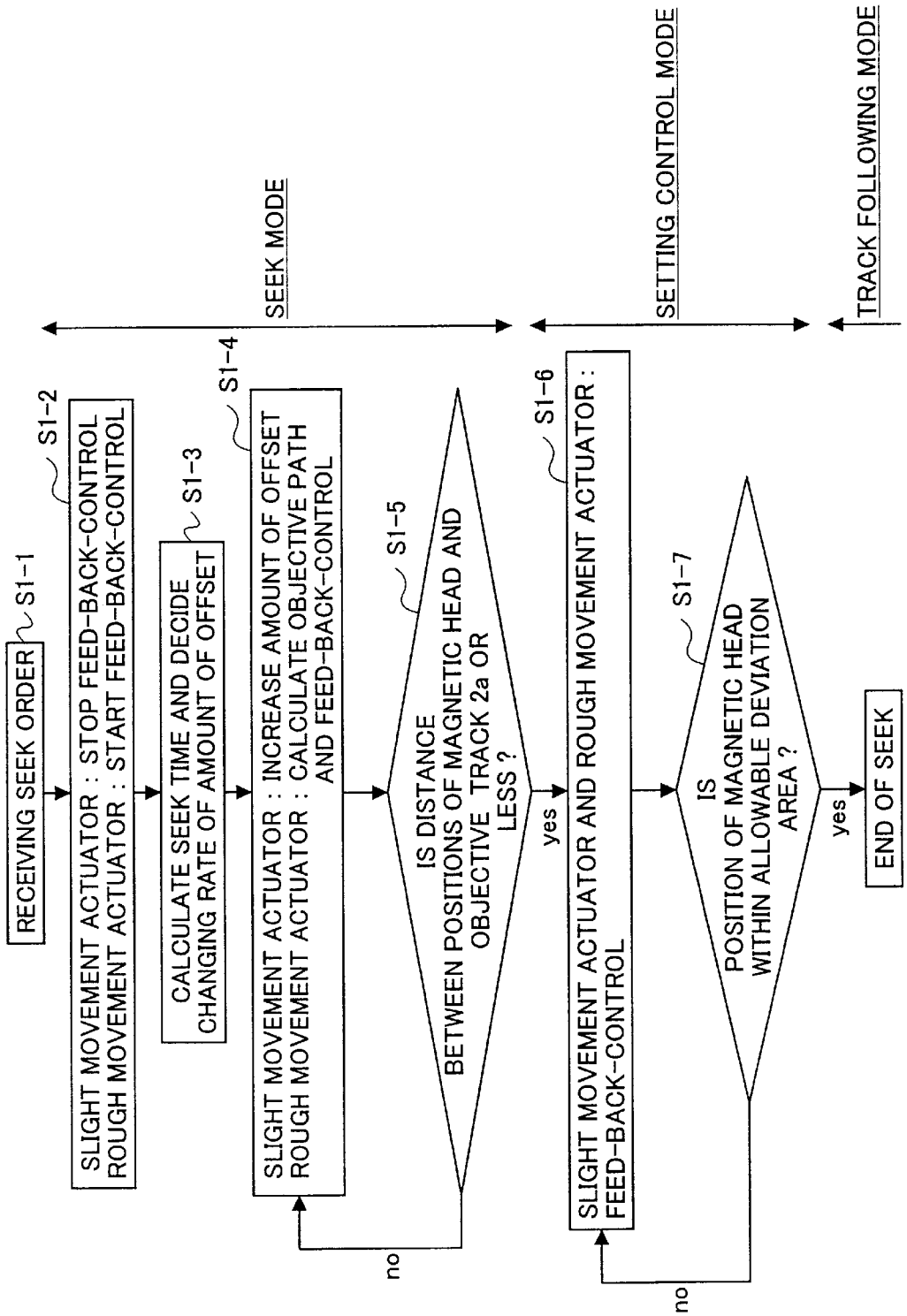
FIG. 9 is a flow chart of an action of a first embodiment of the present invention.

FIG. 9 is a flow chart of an action of the first embodiment.

In this embodiment, a seek action is implemented as in the following steps.

In a step S1-1, the DSP 44 receives a seek order from the MPU 47. In a step S1-2, the DSP 44 stops a feed-back control of the slight movement actuator 36 and starts a feed-back-control of the rough movement actuator 37 along an objective path calculated on a basis of a seek distance.

In a step S1-3, the DSP 44 calculates a seek time based on the seek distance. The MPU 44 also calculates a changing rate of an amount of an offset in order to complete the offset of the slight movement actuator 36 within the seek time.

The amount of the offset of the slight movement actuator 36 is increased and a calculation of an objective path of the rough movement actuator 37 and a feed-back-control to the objective path are implemented in a step S1-4, until a distance between a position of the magnetic head and an objective track is determined to become 2×"a" or less in a step S1-5.

If the distance between the positions of the magnetic head and the objective track is determined to be 2×"a" or less in the step S1-5, a seek mode where the steps S1-2 through S1-5 are implemented is completed and a setting control mode starts in a step S1-6.

In the step S1-6, a feed-back-control to respective objective tracks of the slight movement actuator 36 and the rough movement actuator 37 is started. When the position of the magnetic head is within an allowable deviation area, the DSP 44 transmits a completion of the seek action to the MPU 47 in a step S1-7, and a track following mode is implemented.

Figure 10:
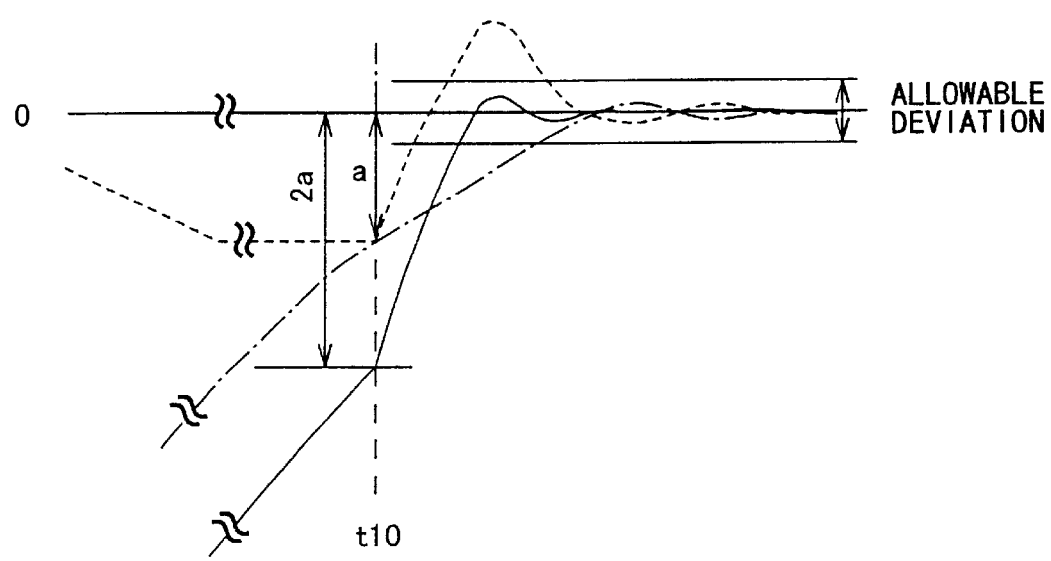
FIG. 10 is a view showing a wave form of a time response regarding a slight movement actuator, a rough movement actuator, and a head position, according to the first embodiment of the present invention.

FIG. 10 is a view showing a wave form of a time response regarding a slight movement actuator, a rough movement actuator, and a head position, according to the first embodiment of the present invention. In FIG. 10, a position of the magnetic head 33 is expressed with a solid line, a driving position of the slight movement actuator 36 is expressed with a dashed line, and a driving position of the rough movement actuator 37 is expressed with a dash dot line.

Figure 8:
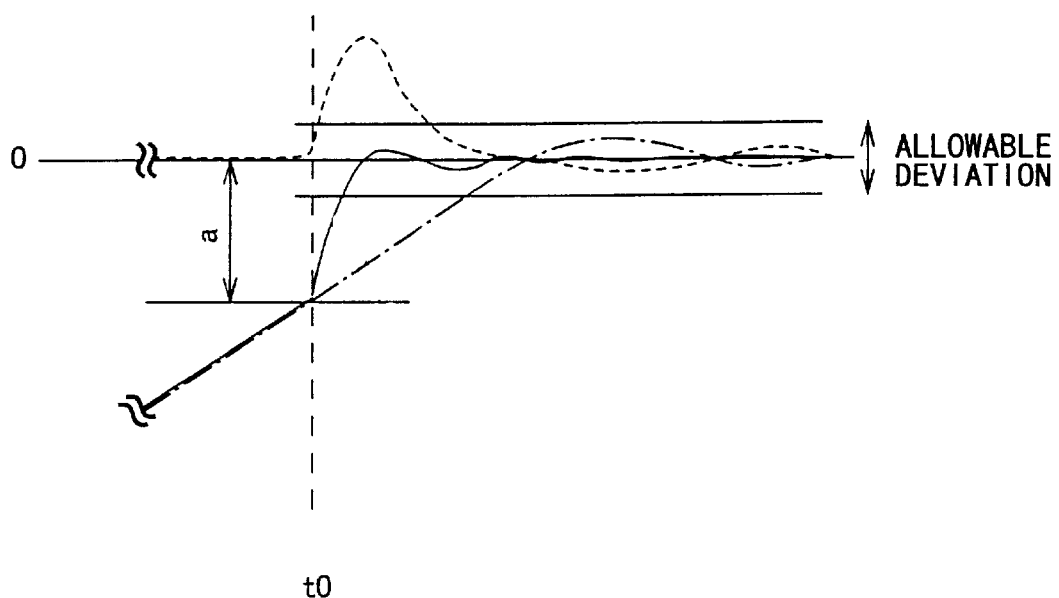
FIG. 8 is a view showing a wave form of a time response regarding a slight movement actuator, a rough movement actuator, and a head position, according to the conventional art.

When an end part of a plus "a" side of a movable area (minus "a" to plus "a") of the slight movement actuator 36 reaches an objective position 0 of the magnetic head 33 at a time of t10, it is possible for the magnetic head 33 to reach the objective position 0 by using the slight movement actuator 36. Hence, the action of the magnetic disk device is changed from the seek action to the settling action. Since the slight movement actuator 36 is shifted a distance of "a" to a reverse direction of a movement direction of the magnetic head 33 in this embodiment, the settling action starts at the time of t10 earlier than t0 shown in FIG. 8.

Because of the shift of the slight movement actuator 36, it is possible to move the rough actuator 37 more quickly than with a conventional device. That is, it is possible to start the settling action at an earlier time than with a conventional device.

The magnetic head 33 is positioned at a place having a distance of 2×"a" from the objective position 0 to a minus direction.

During the settling action, the slight movement actuator 36 is driven to make the magnetic head 33 become positioned at the objective position. The slight movement actuator 36 is shifted by "a" from the objective position 0 to a plus direction as shown by the dashed line in FIG. 10. Then, the rough movement actuator 37 is shifted to the objective position 0 as shown by the one point doted line in FIG. 10. The magnetic head 33 is shifted to the objective position 0 because of the shift of the rough movement actuator 37. Since the magnetic head 33 is shifted as the rough movement actuator 37 is shifted, the slight movement actuator 36 makes the magnetic head 33 shift to follow the above mentioned shift of the magnetic head 33.

According to this embodiment, as shown by the solid line in FIG. 10, the magnetic head 33 is settled within the allowable deviation area where the objective position 0 is the center thereof. After the settling action is implemented, the track following mode is implemented. For instance, an action of information recording and/or playing back is implemented. Since the settling action can be implemented at an earlier time than with the conventional art according to this embodiment, it is possible to set the magnetic head 33 at the objective position 0 in a short period of time. As a result of this, it is possible to start implementing the action of information recording and/or playing back quickly.

In this embodiment, at the time of the seek action and the settling action, the rough movement actuator 37 is controlled to make the rough movement actuator 37 shift to the objective position 0. If the objective positions of both the slight movement actuator 36 and the rough movement actuator 37 are allowed to be shifted from an actual objective position 0 during the times of the seek action and the settling action, it is possible to implement the settling action more quickly.

Next, a second embodiment will be described. In the second embodiment of the present invention, the objective position of the slight movement actuator 36 is shifted to a position having a distance of "a"-"c" from the actual objective position 0 to a plus direction, and the objective position of the rough movement actuator 37 is shifted to a position having a distance of "a"-"c" from the actual objective position 0 to a minus direction, where "c" is defined as a designated and overshooting distance. A structure of the magnetic disk device in this embodiment is substantially the same as the structure of the magnetic disk device shown in FIGS. 1 and 2, and explanation thereof will be omitted. Only an action of the MPU 44 in this embodiment will be described.

Figure 11:
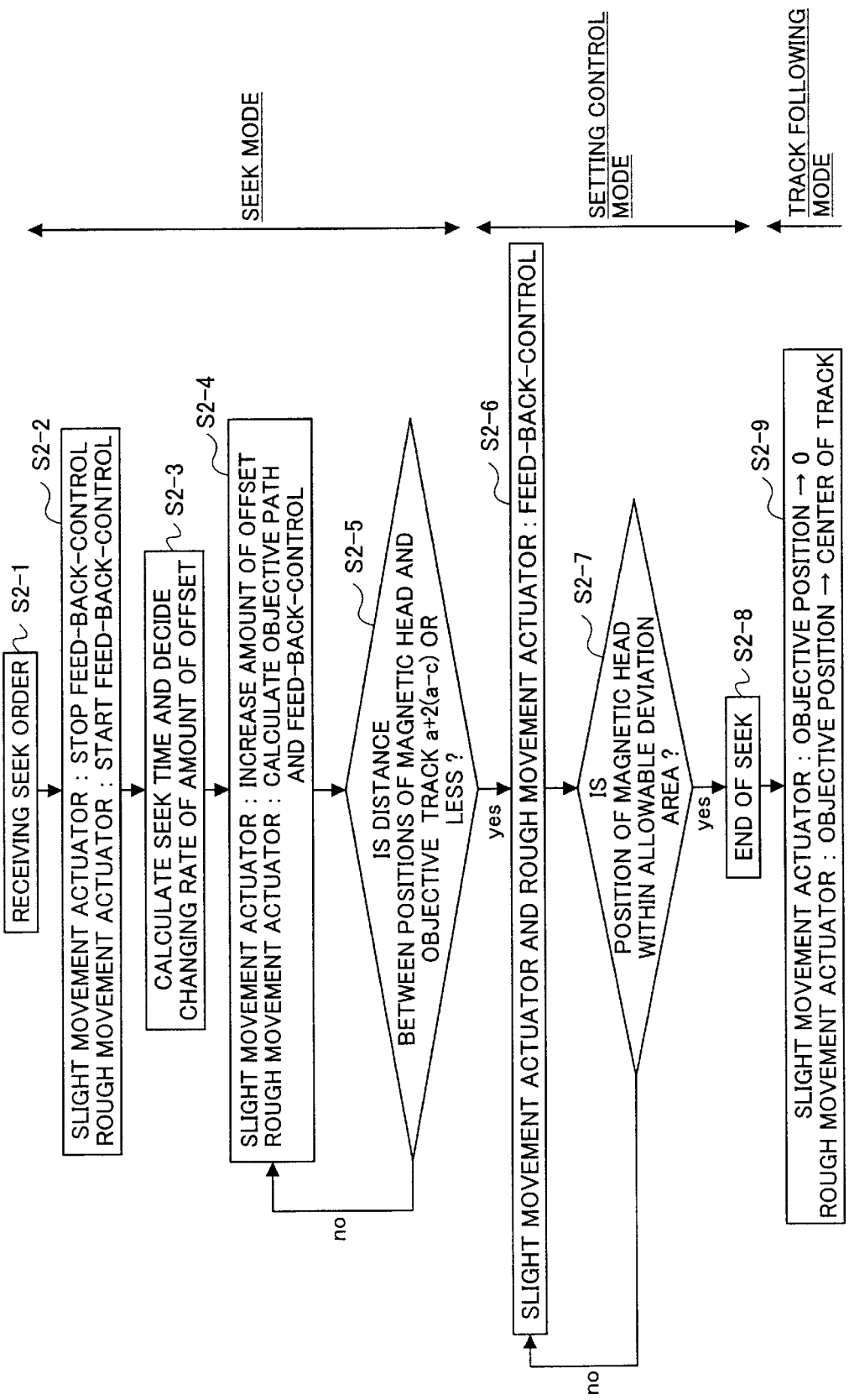
FIG. 11 is a flow chart of an action of a second embodiment of the present invention.

FIG. 11 is a flow chart of an action of a second embodiment.

In a step S2-1, the MPU 44 receives a seek order from the high ranked controller 51. In a step S2-2, the MPU 44 stops a feed-back-control of the slight movement actuator 36 and starts a feed-back-control of the rough movement actuator 37 along an objective path calculated on a basis of a seek distance.

In a step S2-3, the MPU 44 calculates a seek time on a basis of the seek distance. The MPU 44 also calculates a changing rate of an amount of an offset in order to complete the offset of the slight movement actuator 36 within the seek time.

In a step S2-4 the amount of the offset of the slight movement actuator 36 is increased and a control for following the paths of the rough movement actuator 37 are implemented until a distance between a position of the magnetic head 33 and the objective track is determined to become "a"+2×("a"-"c") or less in a step S2-5.

If the distance between the positions of the magnetic head 33 and the objective track is determined to be "a"+2×("a"-"c") or less in the step S2-5, a seek mode where the steps S2-2 through S2-5 are implemented is completed and a settling control mode starts in a step S2-6.

In the step S2-6, a feed-back-control to respective objective tracks of the slight movement actuator 36 and the rough movement actuator 37 starts, where the objective position of the slight movement actuator 36 has a distance of "a"-"c" from the objective position 0. The objective position of the rough movement actuator 37 has a distance of r+("a"-"c") from the objective position 0, where "r" represents a center of the track. That is, the feed-back-control starts in a state where the objective position of the slight movement actuator 36 is shifted to a position having a distance of "a"-"c" from the actual objective position 0 to a plus direction, and the objective position of the rough movement actuator 37 is shifted to a position having a distance of "a"-"c" from the actual objective position 0 to a minus direction.

The feed-back-control is implemented until the position of the magnetic head 33 is determined to be within an allowable deviation area around objective position 0 in a step of S2-7.

When the position of the magnetic head 33 is determined to be within an allowable deviation area in a step of S2-7, the DSP 44 transmits a completion of the seek action to the MPU 47 in a step S2-8.

In this embodiment, the objective position of the slight movement actuator 36 is shifted to a position having a distance of "a"-"c" from the actual objective position 0 to a plus direction, and the objective position of the rough movement actuator 37 is shifted to a position having a distance of "a"-"c" from the actual objective position 0 to a minus direction. Therefore, in a step of S2-9, the objective position of the slight movement actuator 36 is brought close to "0" and the objective position of the rough movement actuator 37 is brought close to "r" after a seek action is completed.

Figure 12:
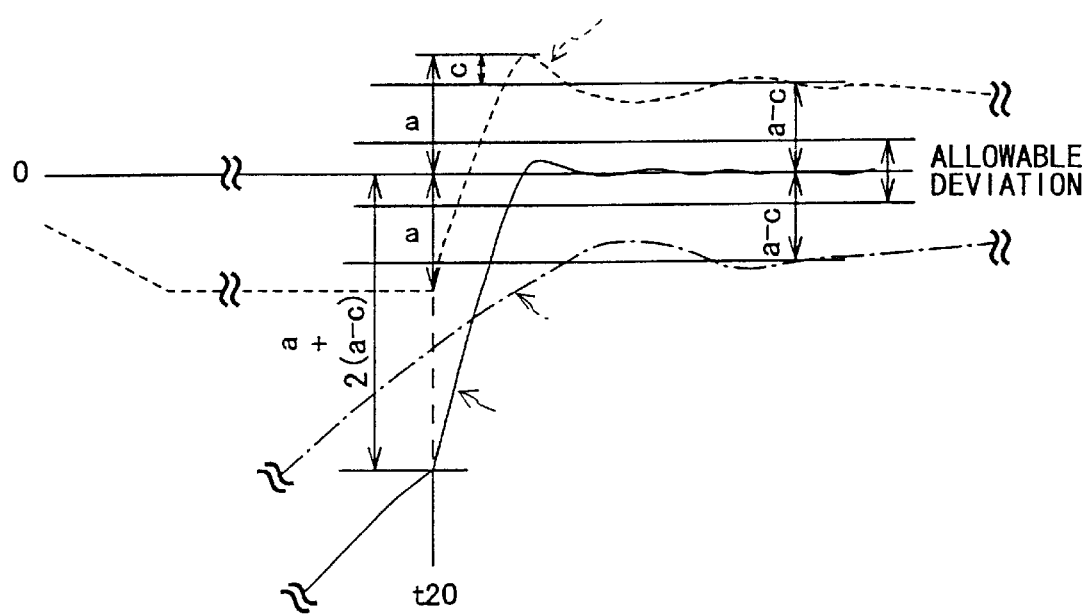
FIG. 12 is a view showing a wave form of a time response regarding a slight movement actuator, a rough movement actuator, and a head position, according to the second embodiment of the present invention.

FIG. 12 is a view showing a wave form of a time response regarding a slight movement actuator, a rough movement actuator, and a head position, according to the second embodiment of the present invention. In FIG. 12, a position of the magnetic head 33 is expressed with a solid line, a driving position of the slight movement actuator 36 is expressed with a dashed line, and a driving position of the rough movement actuator 37 is expressed with an dash dot line.

When an end part of a plus direction of "a" of a movable area (a plus direction of "a" to a minus direction of "a") of the slight movement actuator 36 reaches an objective position 0 of the magnetic head 33 at a time of t20, it is possible to make the objective position 0 by the slight movement actuator 36. Hence, the action of the magnetic disk device is changed from the seek action to the settling action. Since the slight movement actuator 36 is shifted by "a" to a reverse direction of a movement direction of the magnetic head 33, namely a minus direction from the objective position 0 in this embodiment, the settling action starts at the time of t20 earlier than t0 shown in FIG. 8. At this time, since the rough movement actuator 37 is positioned at a place having a distance of "a"-"c" from the objective position 0 to a minus direction and the magnetic head 33 is positioned at a place having a distance of "a"+2×("a"-"c") from the objective position 0 to a minus direction, it is possible to implement the settling action at an earlier time than the first embodiment. Furthermore, it is possible to set the magnetic head 33 at the objective position 0 in a short period of time by implementing the settling action with the slight movement actuator 36 and the rough movement actuator 37.

According to this embodiment, as shown by the solid line in FIG. 12, the magnetic head 33 is settled within the allowable deviation area where the objective position 0 is the center thereof. After the settling action is implemented, the track following mode is implemented. For instance, an action of information recording and/or playing back is implemented. At this time, the objective position of the rough movement actuator 37 is changed from a position having a distance of ("a"+2×("a"-"c")) from the objective position 0, to the objective position 0. According to this embodiment, since the settling action is implemented with the slight movement actuator 36 and the rough movement actuator 37, it is possible to implement the settling action at an earlier time than the first embodiment. Therefore, it is possible to set the magnetic head 33 at the objective position 0 with high speed. Hence, it is possible to start implementing the action of information recording and/or playing back quickly.

In this embodiment, since the limitation of the moveable area of settling action of the slight movement actuator 36 is eased, it is possible to change the settling action at an earlier time than the conventional art. As a result of this, an elapsed time for seek can be reduced. Alternatively, a necessary movable area of the slight movement actuator 36 can be reduced to be a half or less area of the movable area for the slight movement actuator 36 in the conventional art. Hence, it is possible to simplify an electric circuit resulting from a reduction of a necessary driving voltage, or increase a resonance frequency based on an implement action of rigidity of the slight movement actuator 36 or reduce a resonance gain.

Although the magnetic disk devices as devices for information recording and/or playing back are described in this specification, the present invention is not limited to these embodiments, but various variations and modifications may be made without departing from the scope of the present invention. For instance, the present invention can be applied to an optical disk device such as an magnetic optical disk device.

This patent application is based on Japanese priority patent application No. 2001-248218 filed on Aug. 17, 2001, the entire contents of which are hereby incorporated by reference.

What is claimed is:

1. A disk device, comprising:

a head part;

an actuator part having a first part and a second part for moving the head part in a movement direction to an objective position; and a control part for controlling the actuator part;

wherein the control part makes the first part of the actuator part shift to a reverse direction of the movement direction of the head part during a seek action before a settling action of the head part starts being implemented.

2. The disk device as claimed in claim 1, wherein the control part makes the first part of the actuator part shift at a position having a maximum movable distance from the objective position to the reverse direction of the movement direction of the head part before the settling action of the head part starts being implemented.

3. The disk device as claimed in claim 1, wherein the first part is a slight movement actuator for a slight movement of the head part and the second part is a rough movement actuator for a rough movement of the head part.

4. The disk device as claimed in claim 3, wherein an objective position of the slight movement actuator is shifted to the reverse direction of the movement direction of the head part and an objective position of the rough movement actuator is shifted to the movement direction of the head part before a settling action of the head part starts being implemented.

5. The disk device as claimed in claim 4, wherein the objective positions of the slight movement actuator and the rough movement actuator are respectively shifted to positions having a maximum movable distance of the slight movement actuator but eliminating a designated distance from the objective position before a settling action of the head part starts being implemented.

6. The disk device as claimed in claim 1, wherein the disk device is a magnetic disk device.

7. The disk device as claimed in claim 1, wherein the disk device is an optical disk device.

8. A method of positioning a head part provided on an actuator part having a first part and a second part of a disk device, the method comprising the steps of:

(a) moving the actuator part in a movement direction of the head part toward an objective position during a seek action;

(b) shifting the first part of the actuator part to a reverse direction of the movement direction of the head part during the seek action; and (c) moving the first part in the movement direction of the head part to implement a settling action;

thereby the head part is positioned at the objective position.

9. The method of positioning as claimed in claim 8, wherein the first part shifts at a position having a maximum movable distance from the objective position of the head part to the reverse direction of the movement direction of the head part in the step (b).

10. The method of positioning as claimed in claim 8, wherein the first part is a slight movement actuator for a slight movement of the head part and a second part is a rough movement actuator for a rough movement of the head part.

11. The method of positioning as claimed in claim 10, wherein an objective position of the slight movement actuator is shifted to the reverse direction of the movement direction of the head part and an objective position of the rough movement actuator moves in the movement direction of the head part in the step (b).

12. The method of positioning as claimed in claim 11, wherein the objective positions of the slight movement actuator and the rough movement actuator are respectively shifted at positions having a maximum movable distance of the slight movement actuator but eliminating a designated distance from the objective position, in the step (b).

* * * * *